(12) United States Patent
Skaarup

(10) Patent No.: US 6,527,504 B1
(45) Date of Patent: Mar. 4, 2003

(54) PLANT FOR UTILIZING THE ENERGY IN WAVES

(75) Inventor: Erik Skaarup, Gentofte (DK)

(73) Assignee: Waveplane International A/S, Gentofte (DK)

( * ) Notice: Subject to any disclaimer, the term of this patent is extended or adjusted under 35 U.S.C. 154(b) by 0 days.

(21) Appl. No.: 09/719,703

(22) PCT Filed: Jun. 14, 1999

(86) PCT No.: PCT/DK99/00327
§ 371 (c)(1),
(2), (4) Date: Dec. 14, 2000

(87) PCT Pub. No.: WO00/00740
PCT Pub. Date: Jan. 6, 2000

(30) Foreign Application Priority Data

Jun. 16, 1998 (DK) .................................. 1998 0856

(51) Int. Cl.[7] .................................. F03B 13/12
(52) U.S. Cl. .................... 415/3.1; 415/4.1; 415/7; 415/906; 416/85; 416/DIG. 4; 290/53; 60/398
(58) Field of Search .................... 415/3.1, 4.1, 211, 415/4.2, 4.3, 4.4, 4.5, 7, 905, 906, 907, 908; 416/85, DIG. 4; 290/53; 60/398, 502

(56) References Cited

U.S. PATENT DOCUMENTS

| ,655,541 | A | * | 8/1900 | Becker .................. 417/100 |
| 3,687,567 | A | * | 8/1972 | Lininger ................. 415/7 |
| 4,034,231 | A | * | 7/1977 | Conn et al. .............. 290/53 |
| 4,078,871 | A | * | 3/1978 | Perkins, Jr. ............. 290/53 |
| 4,152,895 | A | | 5/1979 | Wirt ..................... 60/398 |
| 4,172,689 | A | * | 10/1979 | Thorsheim ............... 415/7 |
| 4,263,516 | A | | 4/1981 | Papadakis ............... 290/53 |
| 4,286,347 | A | * | 9/1981 | Modisette .............. 60/398 |
| 4,425,510 | A | * | 1/1984 | Jury ..................... 290/53 |
| 4,564,312 | A | * | 1/1986 | Munoz Saiz ............. 415/31 |
| 5,443,361 | A | * | 8/1995 | Skaarup ................. 415/3.1 |

FOREIGN PATENT DOCUMENTS

WO    WO93/09347    5/1993

* cited by examiner

Primary Examiner—John G. Weiss
Assistant Examiner—Richard Woo
(74) Attorney, Agent, or Firm—McCormick, Paulding & Huber LLP (57) ABSTRACT

A plant for utilizing the energy in the waves which are present at a given time in a section of a water area, such as an ocean or a lake. The plant comprises a base located in this section and in the shape of a platform or raft and a wave converter placed on the base and serving for transforming the wave motion of the water into whirling motion. The plant furthermore comprises a number of adjacent wave catches each having at least one catch plate for catching at least part of the water of the waves and making this water flow down along the catch plate from a top front edge to a bottom rear edge on the plate, and a whirl pipe for each wave catch for, via a slot extending along the rear edge of the at least one catch plate, taking up the water flowing along the catch plate so that this water will describe a whirling motion in the whirl pipe. The plant can utilize the average energy in the waves better and with less construction costs than known so far.

10 Claims, 7 Drawing Sheets

PLANT FOR UTILIZING THE ENERGY IN WAVES

BACKGROUND ART

The invention relates to a plant for utilizing the energy in the waves which are present at a given time in a section of a water area such as an ocean or a lake, and comprising a base located in this section and in the shape of a platform or raft and a wave converter placed on the base and serving for transforming the wave motion of the water into whirling motion.

U.S. Pat. No. 4,152,895 discloses a plant with a turbine powered by wavy water transformed into whirling water by means of a wave converter. This converter consists mainly of a horizontally orientated whirl pipe with an elongated gill situated at the water surface. The water of the waves is led via a ramp tangentially in through the gill and is thereby set in whirling motion in the whirl pipe. The whirling water drives the turbine which is situated at an open end of the pipe.

This known plant is only able to utilise the energy in small waves of the kind that is formed in shallow water across a gradually slanting ocean floor. The coefficient of utilisation is low. The static energy of the waves is only utilised to a modest extent. Large waves wash over the plant without contributing particularly to the output of the plant.

The applicant's EP Patent No 0 611 418 B1 which is included in the present application as reference discloses a wave converter situated on a moored raft. The wave converter has a whirl pipe with a longitudinal slot and a wave catch consisting of a number of catch plates which in pairs define elongated channels for leading the water of the waves mainly tangentially into the whirl pipe with increasing velocity. Thereby, the water is made to flow through the whirl pipe in a whirling motion. The whirl pipe is open at both ends, and at each of these ends is placed a energy-converting machine in the shape of e.g. a turbine driven by the whirling water and driving a generator.

This wave converter can utilise the static and dynamic energy of the waves both in shallow and deep water with a large output. The size of the waves that are effectively caught and utilised is set by the dimensions of the plant alone and especially by the height of the wave catch.

A wave converter can be described as a machine which, without any movable parts, transforms the waves into a rotating water flow, which is directly well suited for driving a rotating machine, e.g. a turbine.

Normally, a machine only functions optimally within a specific operating range. Outside this, the machine will be functioning with reduced output.

However, wave energy is not a constant quantity which can form part in optimal placing of a plant. Sometimes, there is hardly any energy while there at other times will be very large amounts of energy available. A given plant will therefore not be able to fully utilise the wave energy which on average is available in a water area.

Normally, the relation between output and investment grows advantageously with the size of the plant. In many cases, it pays to build large plants. However, a large rotating machine, such as a turbine equipped with a generator, costs more than a number of smaller machines with a corresponding total capacity.

SUMMARY OF THE INVENTION

The object of the invention is to provide a plant of the kind mentioned in the opening paragraph, which can utilise the energy of the waves with a larger output than known so far.

A second object of the invention is to provide a plant of the kind mentioned in the opening paragraph, which can produce a given output with less construction costs than known so far.

The novel and unique features according to the invention, whereby this is achieved, is the fact that the plant furthermore comprises at least two adjacent wave catches each having at least one catch plate for catching at least a part of the water of the waves and making this water flow down along the catch plate from a top front edge to a bottom rear edge on the plate, and one whirl pipe for each wave catch for, via a slot extending along the rear edge of the at least one catch plate, taking up the water flowing along the catch plate so that this water will describe a whirling motion in the whirl pipe.

This wave converter can advantageously be arranged with a number of small and therefore relatively inexpensive energy converting machines whether the wave catches are placed in a row next to or behind each other.

In the last-mentioned case, the front edge on the catch plates of each wave catch can be situated higher up than the front edge on the catch plate of the preceding wave catch whereby a number of conversion steps are created that set in as the amplitude and energy content of the waves increase. Thereby, the energy of the waves can be utilised optimally over a very large interval.

In order to prevent that some of the water of the waves run unutilised down between the wave catches, each wave catch can be provided with a cover plate situated close to or in contact with the rearmost catch plate in the preceding wave catch. The cover plates ensure that the water of the passing waves is led into the wave converter without any waste.

In the cases where the wave catches of the wave converter are placed in a row behind each other, the wave converter will, for practical reasons, be formed with a limited number of conversion steps, e.g. two, three, or four. The steps begin functioning one after another as the amplitude of the waves increases. As mentioned above, the energy of the waves is utilised within a very large interval.

Due to the limited number of steps of the wave converter, the utilisation will however occur by jumps. Between these jumps, situations may arise where one or potentially several of the rearmost steps do not receive sufficient water and thereby energy to function satisfactorily.

In order to avoid that the total output of the plant is thereby reduced, at least some of the wave catches of the above rearmost steps can be arranged with a damper arranged to, in case of no or less influx of water to the step, shut off the flow between two catch plates or between a cover plate and a catch plate and, in case of influx of water above a pre-fixed limit, open up for such a flow. At the same time, a channel can be placed above said damper, said channel is extending between two adjacent wave catches.

When a step receives sufficient energy-containing water, the damper opens, and the step is functioning normally. If the influx of water is below a pre-fixed limit, the damper is closed whereby the water in the step via the channel runs down into the preceding step(s) in order to be utilised here.

The wind sets the water into wavy motion and during this gives up a part of its energy to the water.

The wavy water has the advantageous characteristic that it can accumulate the received wind energy. The waves will continue to roll even long time after the wind has dropped. The waves are therefore a far more stable energy source than the wind.

However, the energy pulsates with the frequency of the waves. A rotating machine will normally not be able to follow this frequency, i.e. change the number of revolution at the same rate, and its performance will therefore not be optimally. Furthermore, the intermittent stress is not good for the machine.

However, the pulsations are smoothed to some extent in the whirl pipe owing to the fact that the whirling water in these acts as flywheels which soften the shocks.

This advantageous flywheel effect can be enhanced by means of turbine pipes each constituting an extension of a whirl pipe, and/or by means of a tubular manifold for taking up the whirling water from several whirl pipe. In this case, an energy converting machine is placed at the open end of the whirl pipes or the manifold. The effect is especially great when the whirl pipes and/or manifold are long.

The flywheel effect can be further enhanced by giving the whirl pipes and/or manifold a larger diameter along at least a part of the length. On this part, an extra amount of energy is stored for smoothing the pulsating wave energy.

Furthermore, the whirl pipes and/or manifold can be completely or partly formed with an resilient wall for absorbing the pulsations.

The whirl pipe of the known plant of the above EP Patent No 0 611 418 B1 ends at each end via a turbine pipe in a diffuser tower extending downwardly to calm water. Thereby, it is avoided that on the discharge end of the turbine, damaging pressure impulses are generated which could make the turbines function irregularly.

In order to reduce construction costs, the whirl pipes for the plant according to the invention can via turbine pipes end in a joint diffuser tower.

When this tower is placed at or near the centre of gravity of the wave converter, the tower furthermore serves for keeping a floating plant stable in the water.

If the wave converter is standing on a platform, the diffuser tower can be a leg carrying the platform and at a suitable distance below the surface of the water, having an opening for passage of the water from the whirl pipes.

Such a diffuser tower can be connected to the whirl pipes via curved or helical turbine pipes. Thereby, the turbine pipes obtain a great length, and they can therefore contain a correspondingly large amount of whirling water to, as flywheels, effectively soften the shocks from the pulsating wave energy.

The invention will be explained in greater detail below, giving further advantageous characteristics and effects and describing only exemplary embodiments with reference to the drawing, in which

DETAILED DESCRIPTION OF PREFERRED EMBODIMENTS

Figure 1:
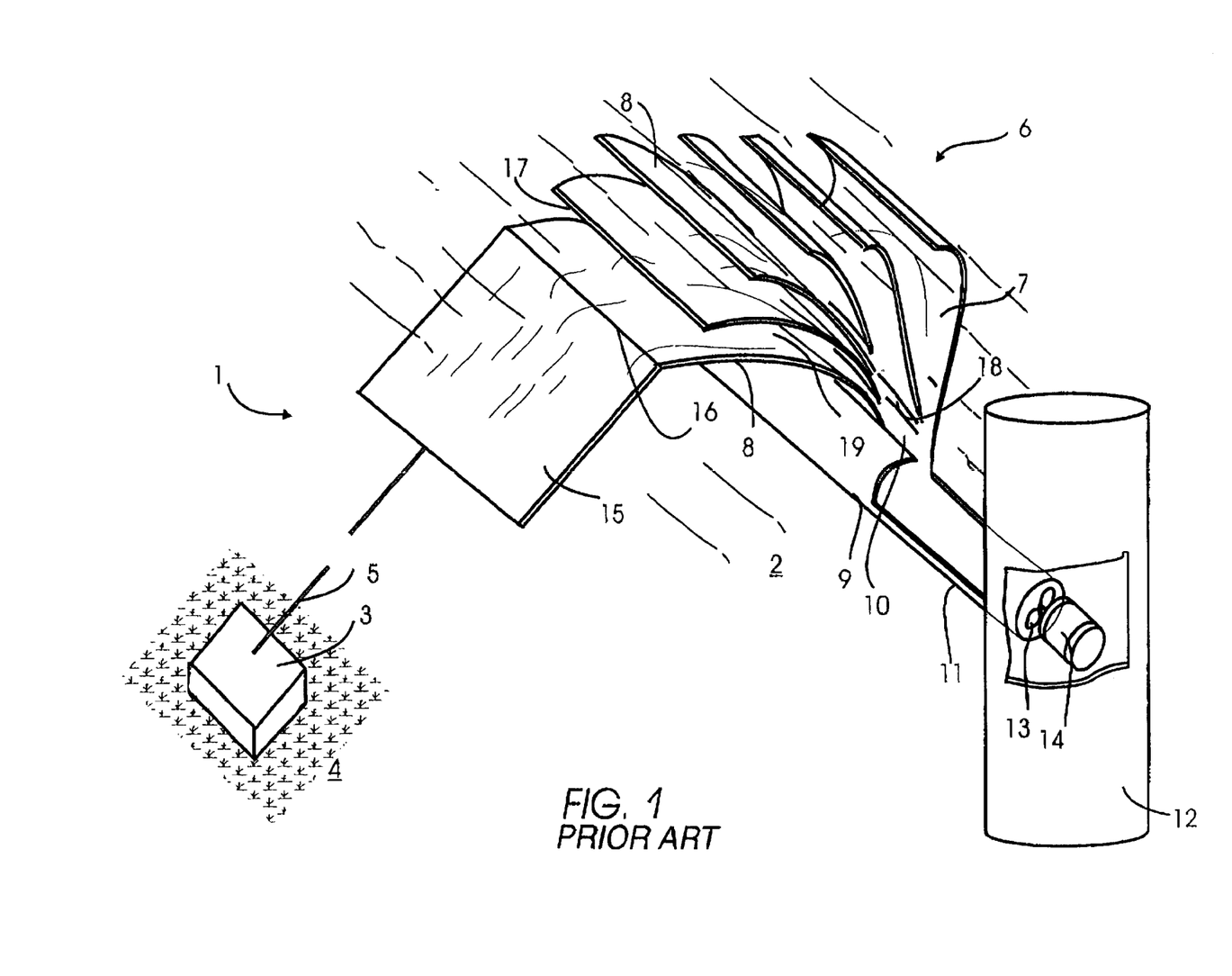
FIG. 1 is a diagrammatic perspective view of a conventional plant for utilizing wave energy.

FIG. 1 shows the fundamental construction of a conventional plant 1 for utilising wave energy. The plant is floating by means of a raft (not shown) in a water area 2 and is moored to an anchorage 3 on the bottom 4 of the water area by means of a mooring line 5. In the following, the water area 2 is assumed to be an ocean.

The plant has a wave converter 6 which mainly comprises a wave catch 7 with a number of catch plates 8 and a whirl pipe 9 with a longitudinal upper slot 10. The whirl pipe continues in a turbine pipe 11 to a vertically placed diffuser tower 12 extending down to calm water. In the turbine pipe is placed a turbine 13 that drives a electric generator 14. Part of the wall of the diffuser tower is removed so that the mouth of the turbine pipe in the diffuser tower, the turbine and the generator can be seen.

A ramp 15 is extending obliquely downwards in the water from the front edge 16 of the first catch plate 8, and each catch plate 8 is extending from a top front edge 17 downwards to a bottom rear edge 18 extending along the slot 10 of the whirl pipe 9. Seen in cross section, each catch plate is furthermore extending mainly tangentially in relation to the whirl pipe. The catch plates 8 two by two delimit a number of flow channels 19 that taper towards the slot 10 of the whirl pipe.

The raft (not shown) is arranged and moored so that it can swing and thereby always make the front edges of the catch plates face or obliquely face the wave front. The incoming waves will therefore more or less be caught by the wave catch 7.

An upper part of the waves will wash over and down into the flow channels 19 of the wave catch while a subjacent part will run up the ramp and then into the channels.

The caught water flows with increasing velocity through the tapering flow channels 19 and from there via the slot 10 mainly tangentially into the whirl pipe 9 whereby the water in this pipe is set in whirling motion. The rotating water flow will via the turbine pipe 11 continue into the diffuser tower 12 and from there down into the calm water below the diffuser tower.

The water flow through the turbine pipe makes the turbine in this pipe rotate. Thereby, a substantial part of the kinetic energy of the water is converted into mechanical energy which again is converted into electrical energy in the electric generator.

The above technique is known from the applicant's EP Patent No 0 611 418 B1 to which reference is made for further details.

Figure 2:
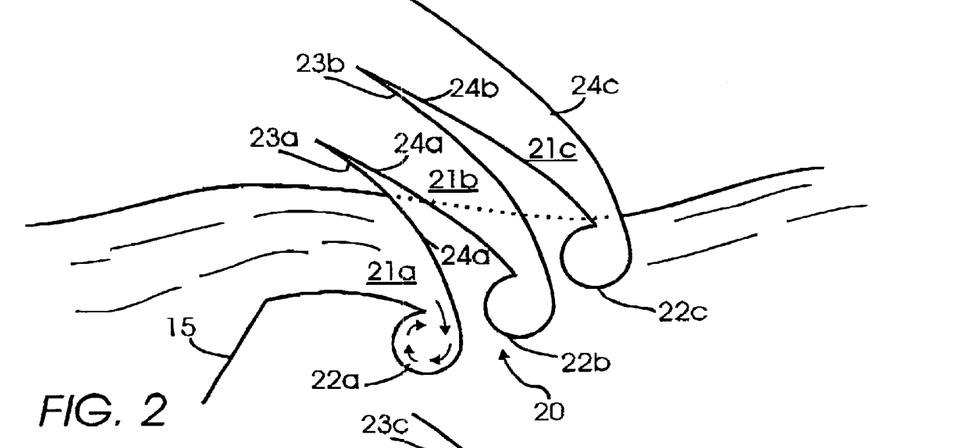
FIG. 2 is a diagrammatic side elevational view of one embodiment of a plant according to the invention in one operating situation.
Figure 3:
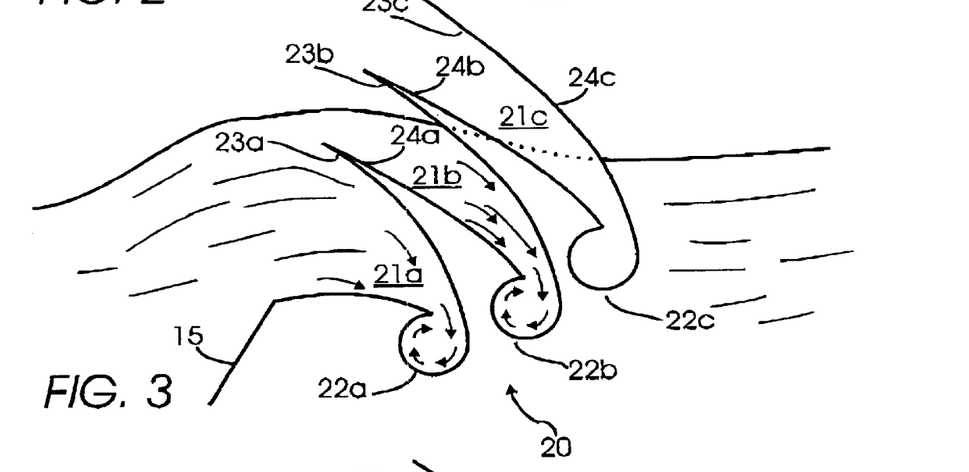
FIG. 3 is a diagrammatic view of the plant in FIG. 2 in a second operating situation.
Figure 4:
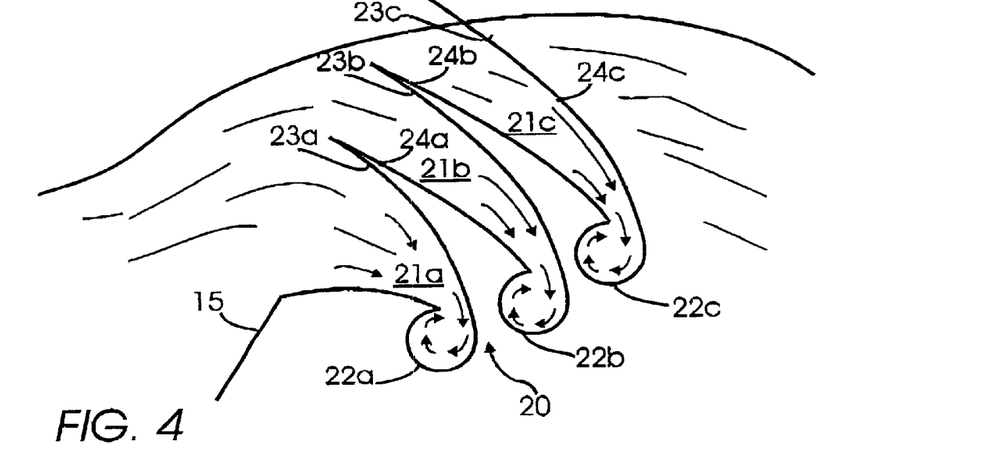
FIG. 4 is a diagrammatic view of the plant in FIG. 2 in a third operating situation.

FIGS. 2, 3, and 4 show a further development of this technique. This plant has a diagrammatically shown wave converter 20 with in this case three wave catches 21a,b,c and three whirl pipes 22a,b,c belonging thereto and disposed in a row behind each other. Each wave catch is for illustrative reasons only shown with a single catch plate 23a,b,c. In practise, each wave catch can be provided with any other suitable number of catch plates and the wave converter can be provided with another number of wave catches.

In the shown case, the three wave catches are identical. The wave catch 21c is however placed higher up than the wave catch 21b which again is placed higher up than the wave catch 21a.

The space between the wave catches is closed by cover plates 24a,b,c connecting the top edge of each catch plate to the respective whirl pipe. The cover plates serve for preventing energy-loss owing to the fact that part of the wave water flows unutilised down through open spaced between the wave catches.

The particular arrangement of the wave converter is illustrated by viewing it in operation in three different situations.

In FIG. 2, the waves are so low that they are fully caught already by the first catch plate 23a. In FIG. 3, the waves have reached such a height that they are caught by both the first 23a and the higher second catch plate 23b. In FIG. 4, the waves are now so high that all three catch plates 23a,b,c contribute in catching the waves.

The wave catches 21a,b,c with thereto belonging whirl pipes 22a,b,c each function in the same way as the one shown in FIG. 1 and the above conventional wave catch, but contrary to this one, the wave converter 20 according to the invention is divided into three smaller steps which each can be set to function optimally in e.g. the situation shown in FIG. 2.

The plant according to the invention can therefore utilise the wave energy optimally within a very large range ranging from the situation shown in FIG. 2 with small, low-energy waves to the one shown in FIG. 4 with large, high-energy waves.

Thereby, the average wave energy of the ocean is utilised with a far greater output than what is possible with a conventional plant which only would be able to function optimally within a very limited operating range.

When the whirl pipes 22a,b,c are provided with each their energy converting machine (not shown in FIGS. 2, 3, and 4), the advantage is furthermore obtained in that the construction costs will be reduced as one big machine is more expensive than a number of small machines with collectively the same capacity.

In FIGS. 2, 3, and 4, the waves are shown in situations where the wave catches 21a,b,c begin to function optimally step by step. In practise, all sorts of intermediary situations can however occur.

Figure 5:
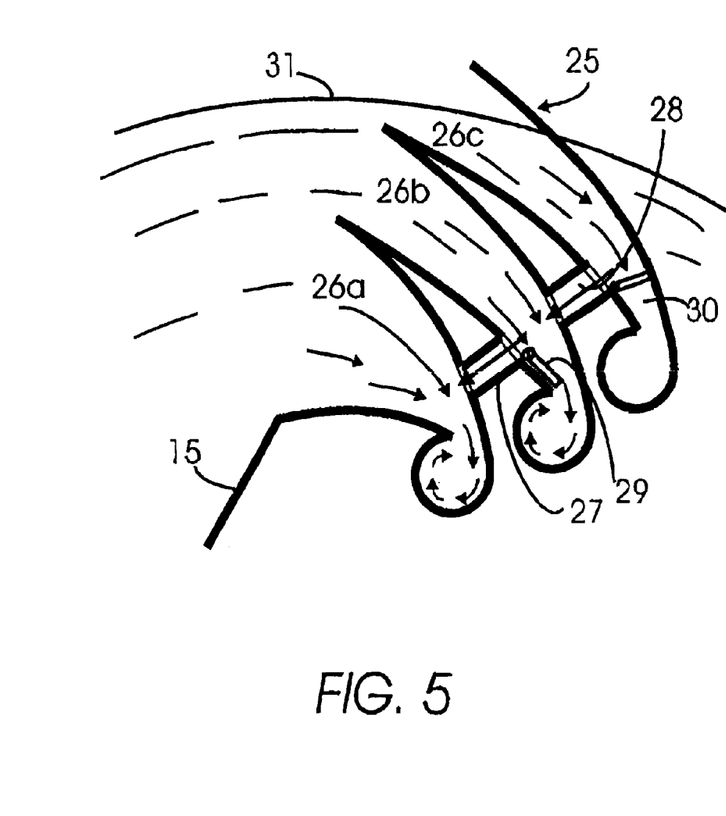
FIG. 5 is a diagrammatic side elevational view of a second embodiment of a plant according to the invention in one operating situation.
Figure 6:
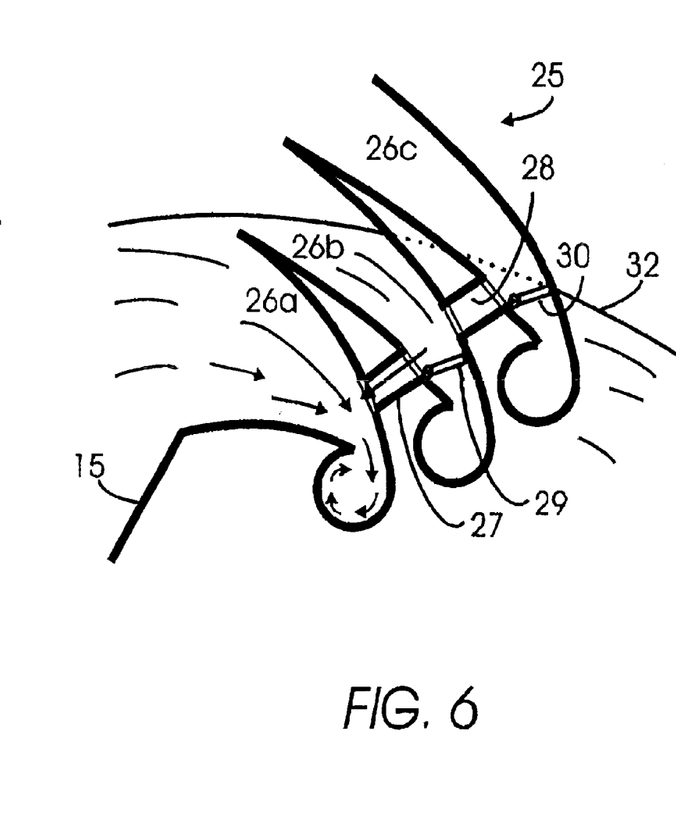
FIG. 6 is a diagrammatic view of the plant in FIG. 5 in a second operating situation.

Such situations are illustrated in FIGS. 5 and 6 that show a wave converter 25 with a first step 26a, a second step 26b, and a third step 26c. The two first steps 26a and 26b are interconnected to a channel 27, and the last two steps 26b and 26c to a second channel 28. In the second step 26b, there is furthermore a flap 29 and in the third a flap 30.

The relatively large wave 31 in FIG. 5 fills the two first steps 26a,b completely while the last step 26c is not filled sufficiently to function optimally. In this situation, the flap of the step is arranged to shut the slot of this step's whirl pipe so that the water via the second channel 28 and the first channel 27 is forced to flow down into the two preceding steps 26a and 26b to be utilised here. The smaller wave 32 in FIG. 6 does not reach the third step 26c and only partly the second step 26b. The flap 29 of this step is therefore closed so that the water sent in by the wave to the second step 26b runs down and is utilised in the first step 26a via the first channel 27.

As can be seen, the wave converter according to the invention thus also functions optimally between the situations shown in FIGS. 2, 3, and 4.

Figure 7:
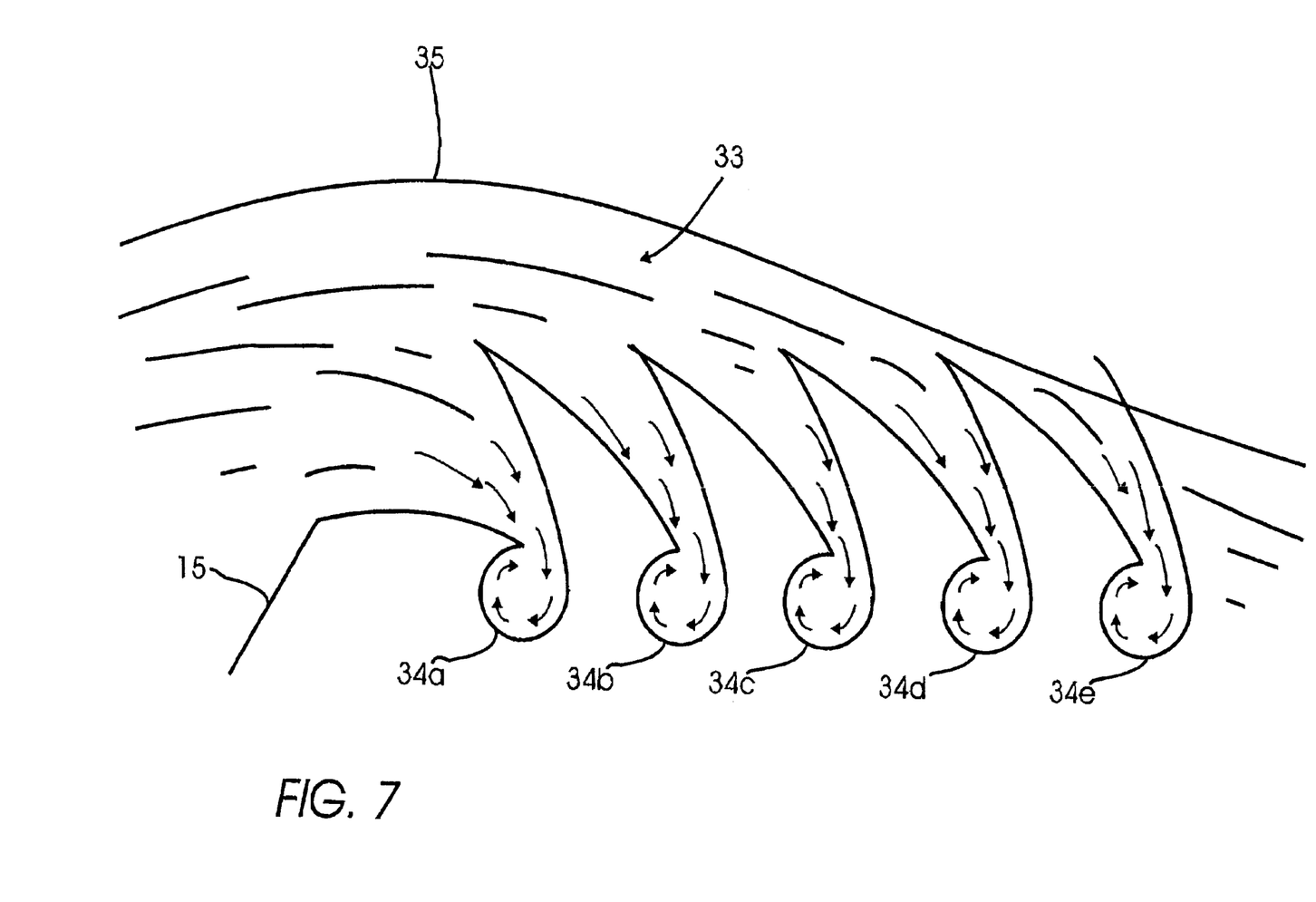
FIG. 7 is a diagrammatic side elevational view of a third embodiment of a plant according to the invention.

FIG. 7 shows a wave converter 33 in this case with five steps 34a,b,c,d,e placed at the same level behind each other. Having many steps, the wave catches obtain a very great size in the direction in which the waves wander. Even a so high and long wave as the shown wave 35 can therefore be caught successfully by the wave converter.

Figure 8:
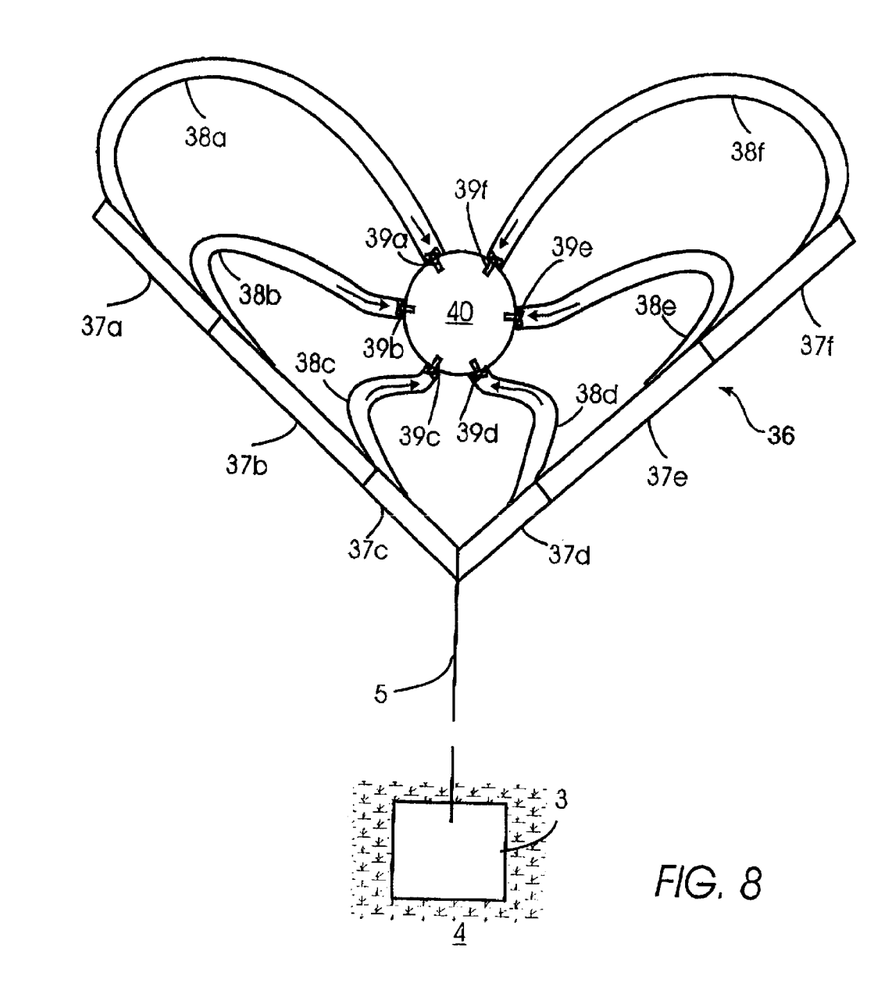
FIG. 8A is a diagrammatic plan view of a third embodiment of a plant according to the invention with a diffuser tower belonging thereto.

In the above cases, the steps of the wave converter were placed in a row behind each other. FIG. 8 shows from above the whirl pipes in a wave converter 36 with six steps 37a,b,c,d,e,f placed in a row next to each other. The whirl pipes are, via long turbine pipes 38a,b,c,d,e,f with each their energy converting machine 39a,b,c,d,e,f e.g. a turbine with a generator, connected to a joint diffuser tower 40. By means of this arrangement, the following advantages are obtained.

The construction costs are reduced as six smaller energy converting machines are used in stead of one large and thereby more expensive machine. The rotating volumes of water in the long whirl pipes act as flywheels which have a considerable inertia and therefore are able to effectively smoothen the pulsations derived from the wavy motion of the water at the entrance to the wave converter. The joint diffuser tower is less expensive than six towers, and when it is placed centrally in the wave converter as shown, a floating plant will be stable in the water.

FIG. 8 also shows that the plant is wedge-shaped and is moored to the bottom 4 of the ocean by means of an anchorage 3 and a mooring line 5 fastened at the point of the wedge. The plant will therefore always swing so that the front edges of its catch plates (not shown in the fig.) are turned towards the wave front.

Figure 9:
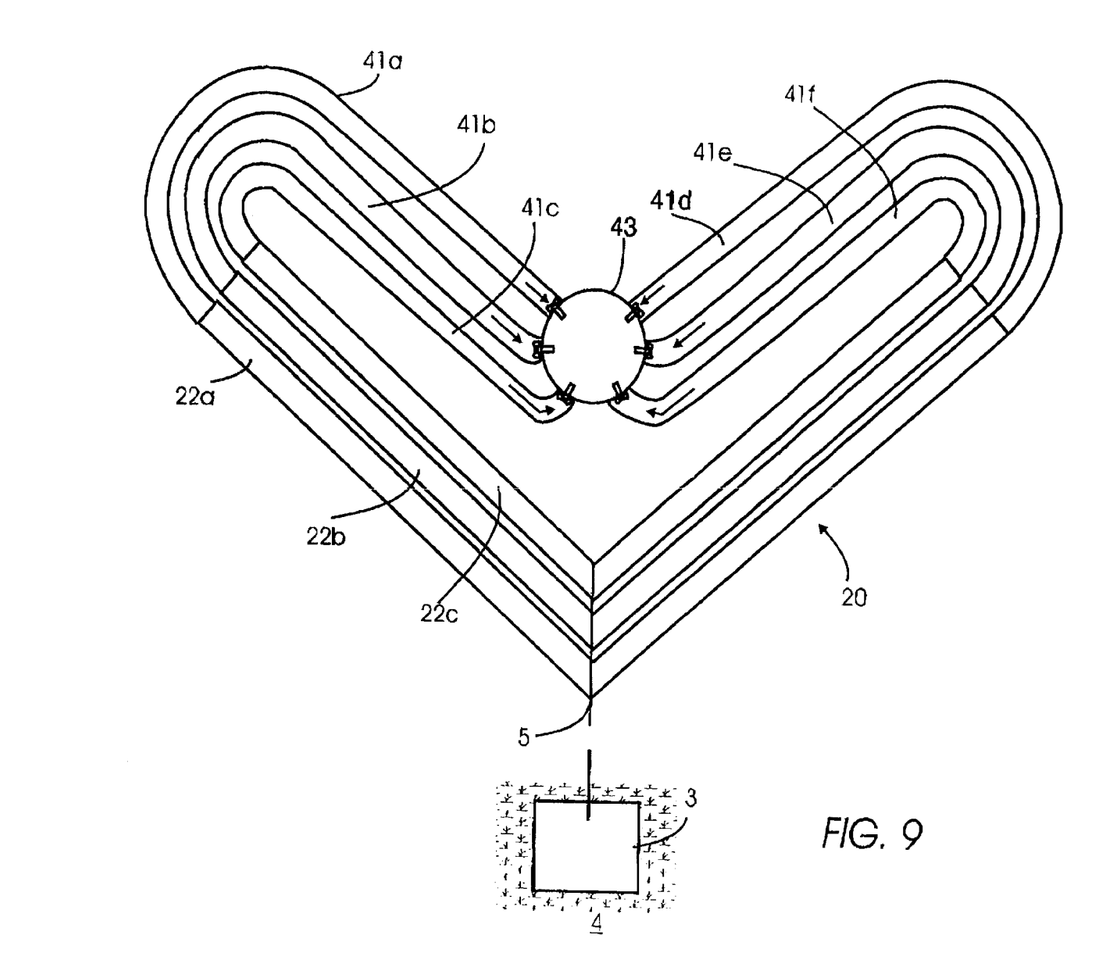
FIG. 9 is a diagrammatic plan view of the plant shown in FIGS. 2, 3, and 4 with a diffuser tower belonging thereto.

FIG. 9 shows diagrammatically the whirl pipes 22a,b,c in the wave converter 20 in FIGS. 2, 3, and 4. The whirl pipes are, via long turbine pipes 41a,b,c,d,e,f, connected to a centrally placed diffuser tower 43. With this arrangement, the same advantage is obtained as described above with reference to FIG. 8.

When the whirl pipes are as long as shown in FIGS. 8 and 9, the mentioned advantageous flywheel effect is obtained for smoothing the pulsations from the wavy water at the entrance to the wave converter.

Figure 10:
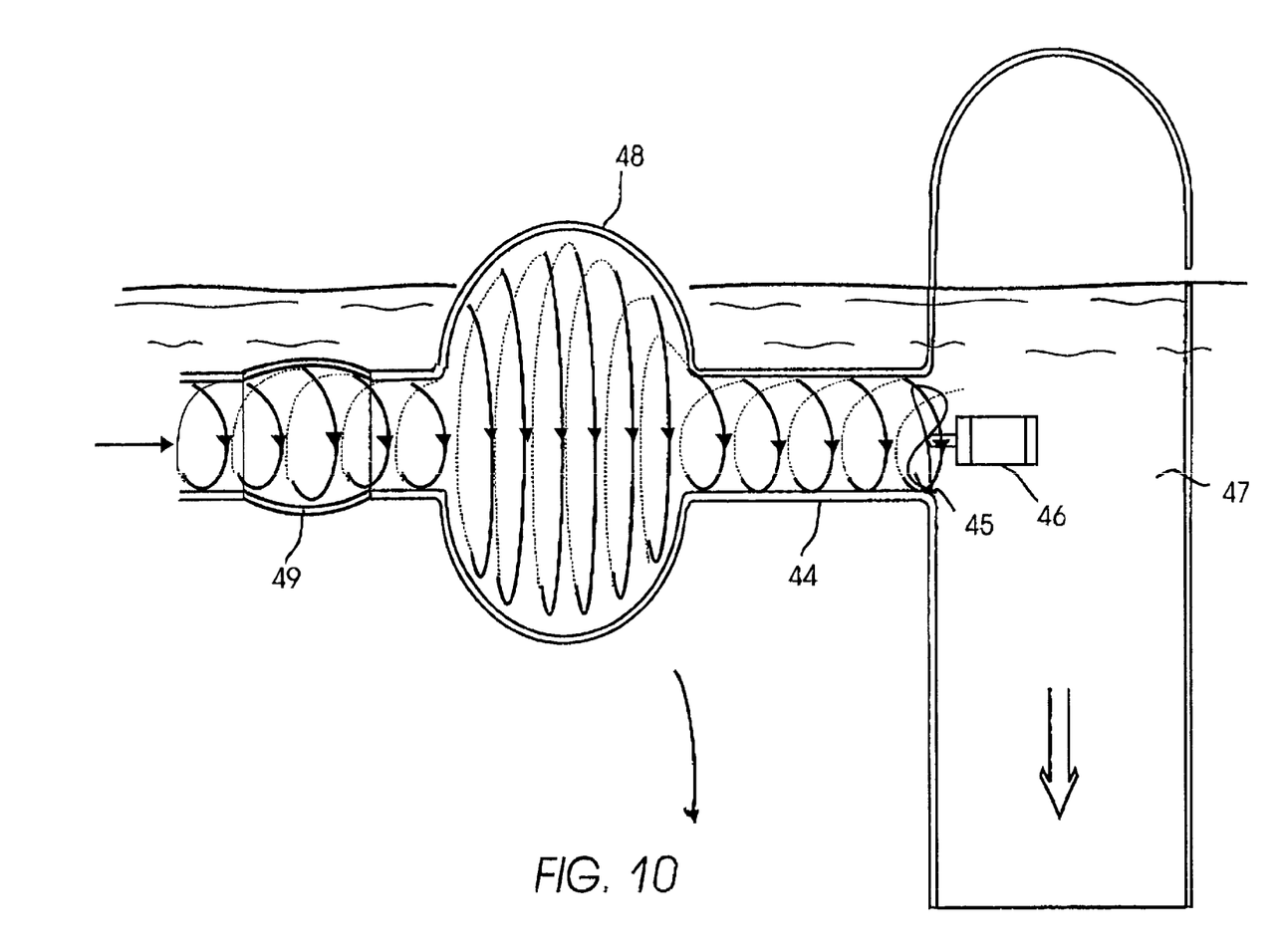
FIG. 10 is a diagrammatic fractional view of the plant shown in FIG. 8.

FIG. 10 shows a construction serving for increasing this effect. A turbine pipe 44 with a turbine 45 driving an electric generator 46 ends in a diffuser tower 47. As can be seen, the turbine pipe is provided with a section 48 which has a much larger diameter than the rest of the turbine pipe. The rotating water in the section 48 is thereby imparted with a very large inertia for effectively smoothing the pulsations in the rotating water that flows to the turbine 45.

The wave converters described above and shown in the drawing all had a certain number of wave catches, and each wave catches only had one catch plate. This is naturally only to be taken as an example. Within the scope of the invention, a wave converter according to the invention can have any suitable number of wave catches, and each wave catch can have any suitable number of catch plates. One and the same wave converter can furthermore have wave catches placed in combination both next to and behind each other.

Just as wind, waves are a permanent and environmentally desirable energy source but far more stable and concentrated. The plant according to the invention can therefore be utilised as power plant for producing inexpensive electric power with great advantage.

It can e.g. be utilised for supplying water to arid regions, such as deserts, as power plants according to the invention can be placed off the coast of these regions. The inexpensive power from these power plants can then be utilised for driving pumps in plants which by means of reverse osmosis cleans sea water so that it is drinkable and/or usable for irrigation.

The plant according to the invention can also function as a pump for e.g. impelling water in lakes low in oxygen or performing digging tasks on the sea bed.

I claim:

1. A plant for utilizing the energy in waves which are present at a given time in a section of a water area (2) and which comprises a base located in the section and a wave converter (20) placed on the base and serving for transforming the wave motion of the water into whirling motion, wherein the wave converter comprises;
   at least two adjacent wave catches (21a, b, c) each having at least one catch plate (23a, b, c) for catching at least a part of the water of the waves and make the water flow down along the catch plate from a top front edge (17) to a bottom rear edge (18) on the plate, and
   a whirl pipe (22a, b, c) for each wave catch for, via a slot (10) extending along the rear edge of the at least one catch plate, taking up the water flowing along the rear edge of the catch plate so that this water will describe a whirling motion in the whirl pipe.

2. A plant according to claim 1, wherein belonging to each wave catch is a cover plate (24a, b, c) situated close to or in contact with the rearmost catch plate in the preceding wave catch.

3. A plant according to claim 1, wherein the wave catches are placed in a row behind each other, and that the front edge on the at least one catch plate of each wave catch is situated higher up than the front edge of the at least one catch plate of the preceding wave catch.

4. A plant according to claim 3, wherein in at least one of the rearmost wave catches has a damper arranged to, in case of no or less influx of water below a pre-fixed limit to the wave catch, shut off the flow to another wave catch and, in case of influx of water above a pre-fixed limit, open up for such a flow, and that above said damper at least one channel (19) is placed which is extending to the preceding wave catch.

5. A plant according to claim 1, wherein the wave catches are disposed next to each other.

6. A plant according to claim 1 wherein the plant comprises at least one mainly tubular manifold, and that at least two whirl pipes end in this manifold.

7. A plant according to claim 6, wherein the plant comprises at least one turbine (14) placed in fluid communication with the whirl pipe.

8. A plant according to claim 7 and where the at least one turbine is placed in a turbine pipe (38a, b, c, d, e, f; 41a) in fluid communication with the whirl pipe wherein the turbine pipe has a resilient wall along an area.

9. A plant according to claim 7 and where the at least one turbine is placed in a turbine pipe in fluid communication with the whirl pipe wherein the turbine pipe along a section before the turbine has a larger diameter than the rest of the turbine pipe.

10. A plant for utilizing the energy in waves which are present at a given time in a section of a water area (2) and which comprises a base located in the section and a wave converter (20) placed on the base and serving for transforming the wave motion of the water into whirling motion, the wave converter comprises;
    at least two adjacent wave catches (21a, b, c) each having at least one catch plate (23a, b, c) for catching at least a part of the water of the waves and make the water flow down along the catch plate from a top front edge (17) to a bottom rear edge (18) on the plate, and
    a whirl pipe (22a, b, c) for each wave catch for, via a slot (10) extending along the rear edge of the at least one catch plate, taking up the water flowing along the catch plate so that this water will describe a whirling motion in the whirl pipe;
    wherein the plant comprises at least one mainly tubular manifold, and that at least two whirl pipes end in this manifold;
    wherein the plant comprises at least one turbine (14) placed in fluid communication with the whirl pipe;
    where the at least one turbine is placed in a turbine pipe (38a, b, c, d, e, f; 41a) in fluid communication with the whirl pipe wherein the turbine pipe has a resilient wall along an area; and
    wherein at least two of the turbine pipes are extending in a curved or helical shape to a joint diffuser tower (40) extending a distance below the water surface.

* * * * *